9 Sheets—Sheet 1.
N. WIARD.
PROJECTILES FOR HEAVY ORDNANCE.
No. 176,107. Patented April 11, 1876.
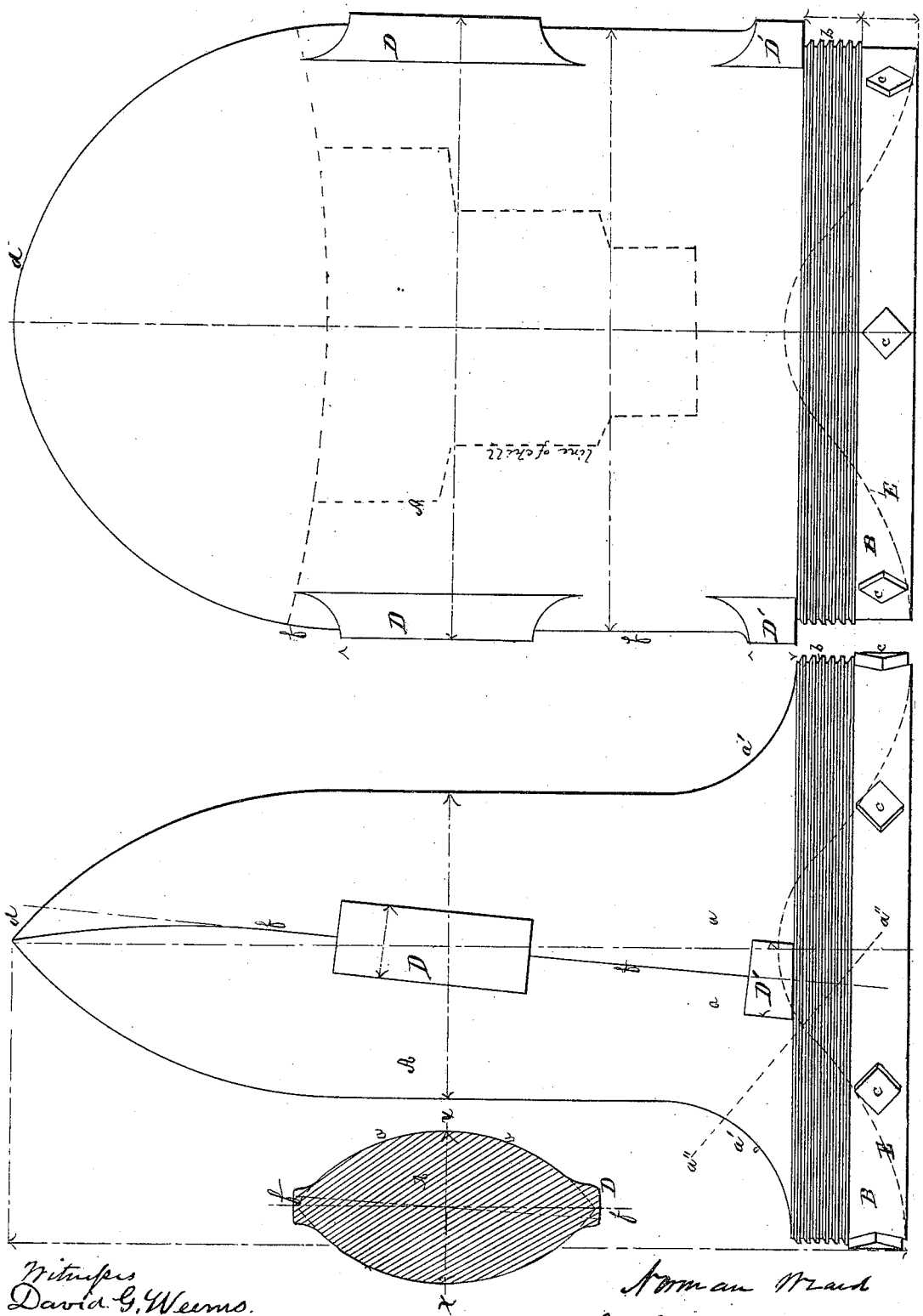

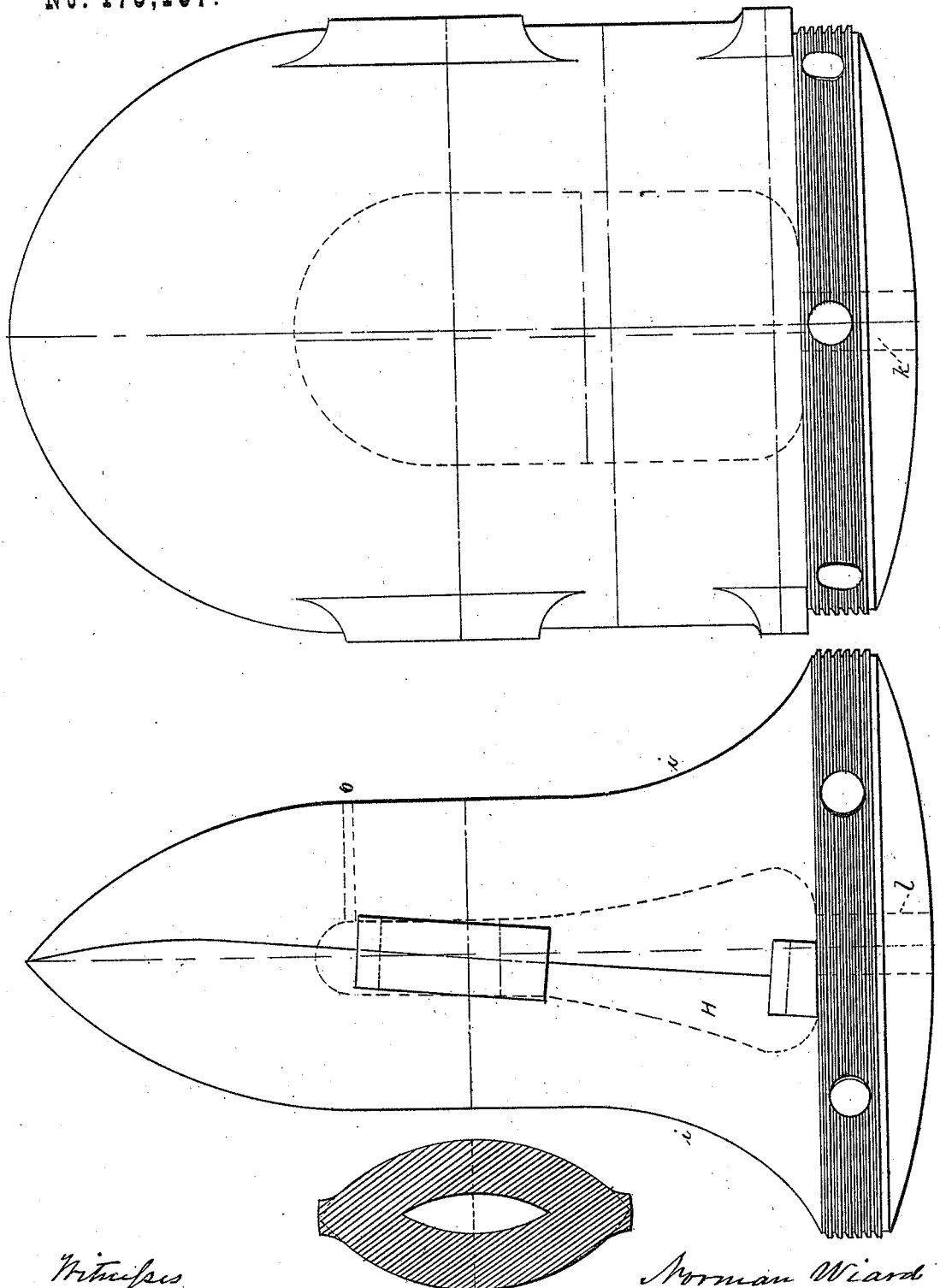

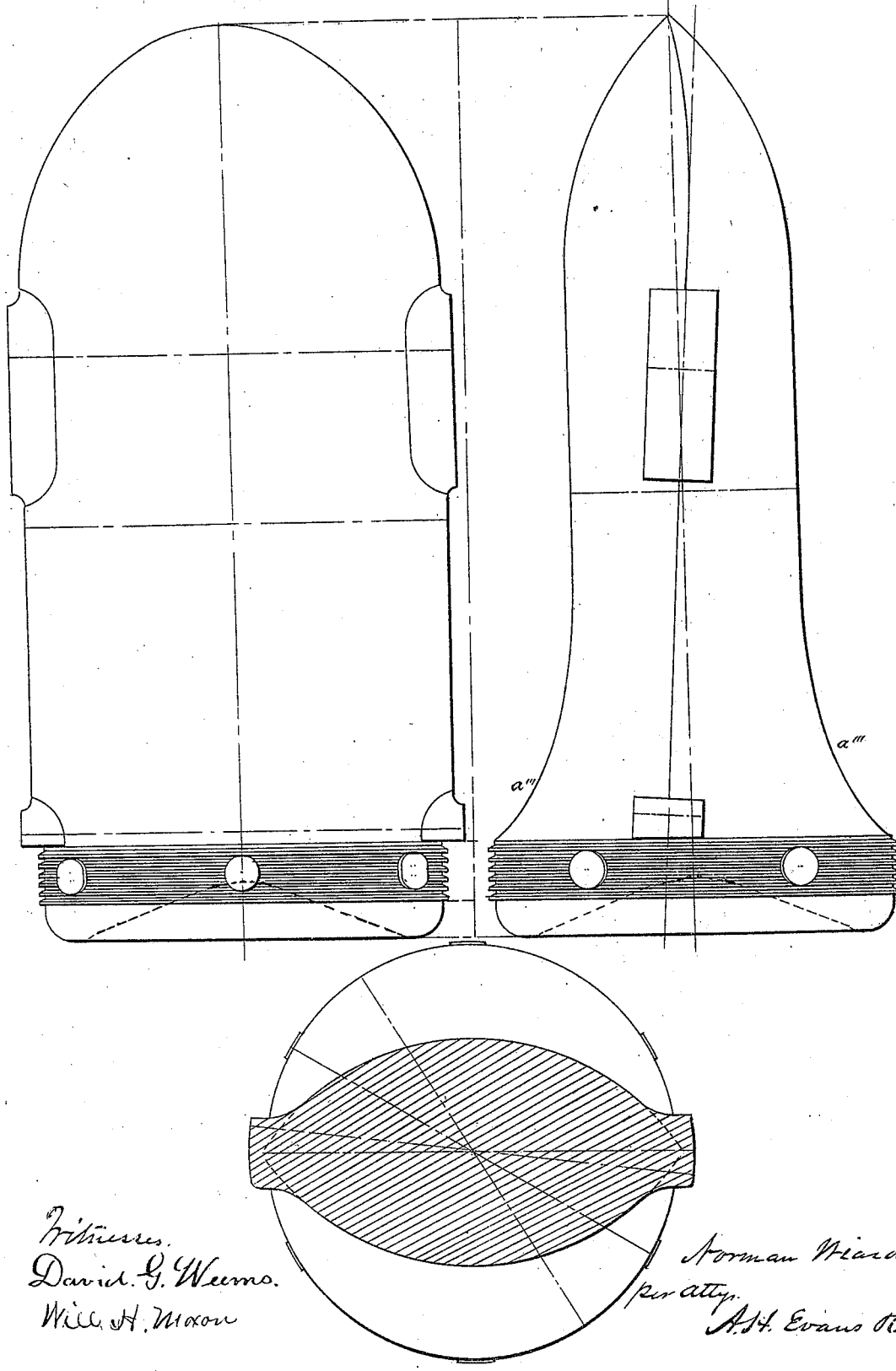

9 Sheets—Sheet 4.
N. WIARD.
PROJECTILES FOR HEAVY ORDNANCE.
No. 176,107. Patented April 11, 1876.
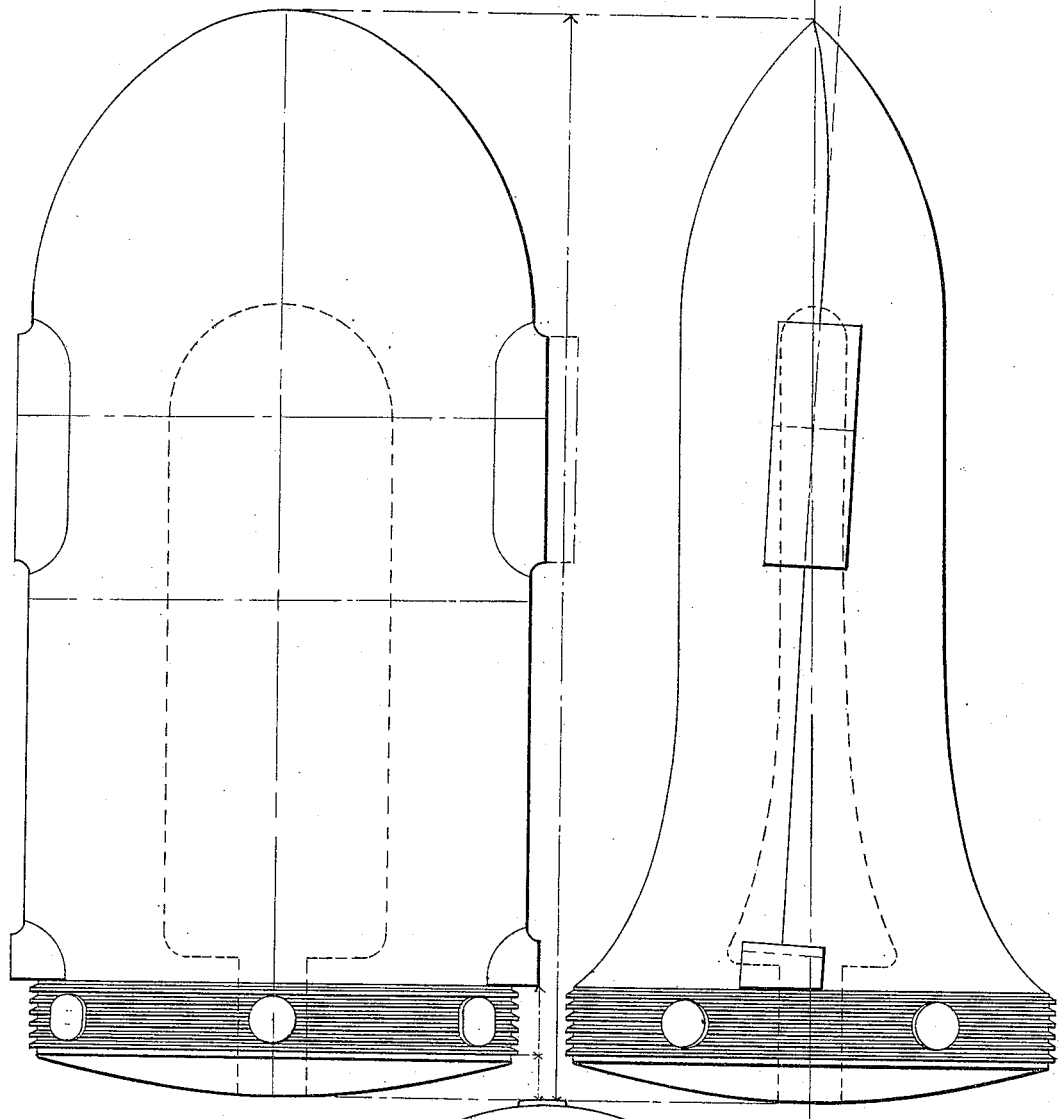
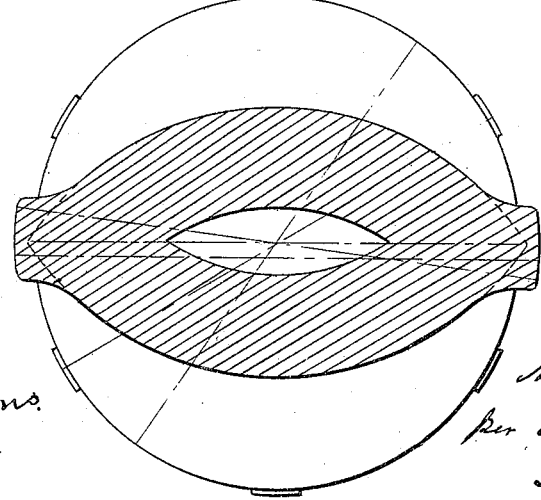

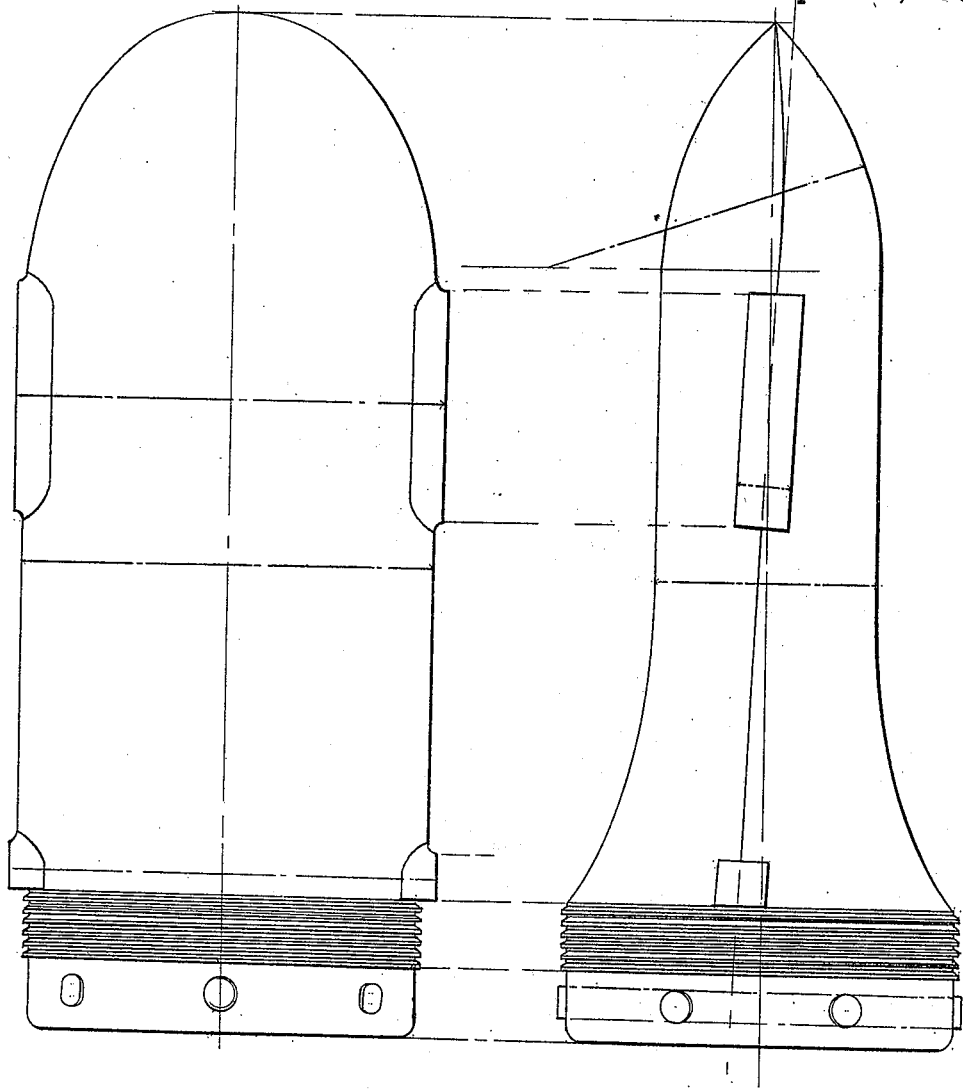
N. WIARD.
PROJECTILES FOR HEAVY ORDNANCE.
No. 176,107. Patented April 11, 1876.
9 Sheets—Sheet 5.
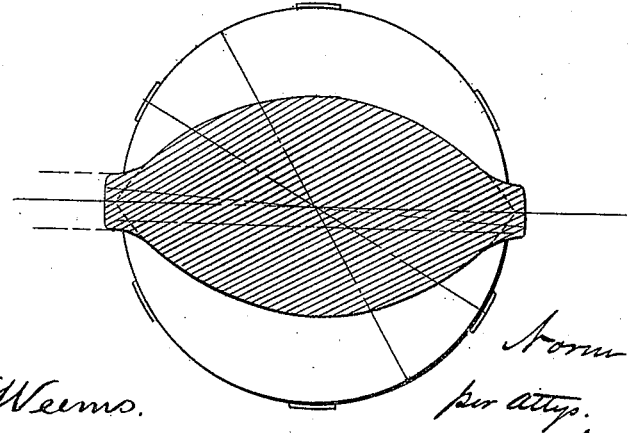

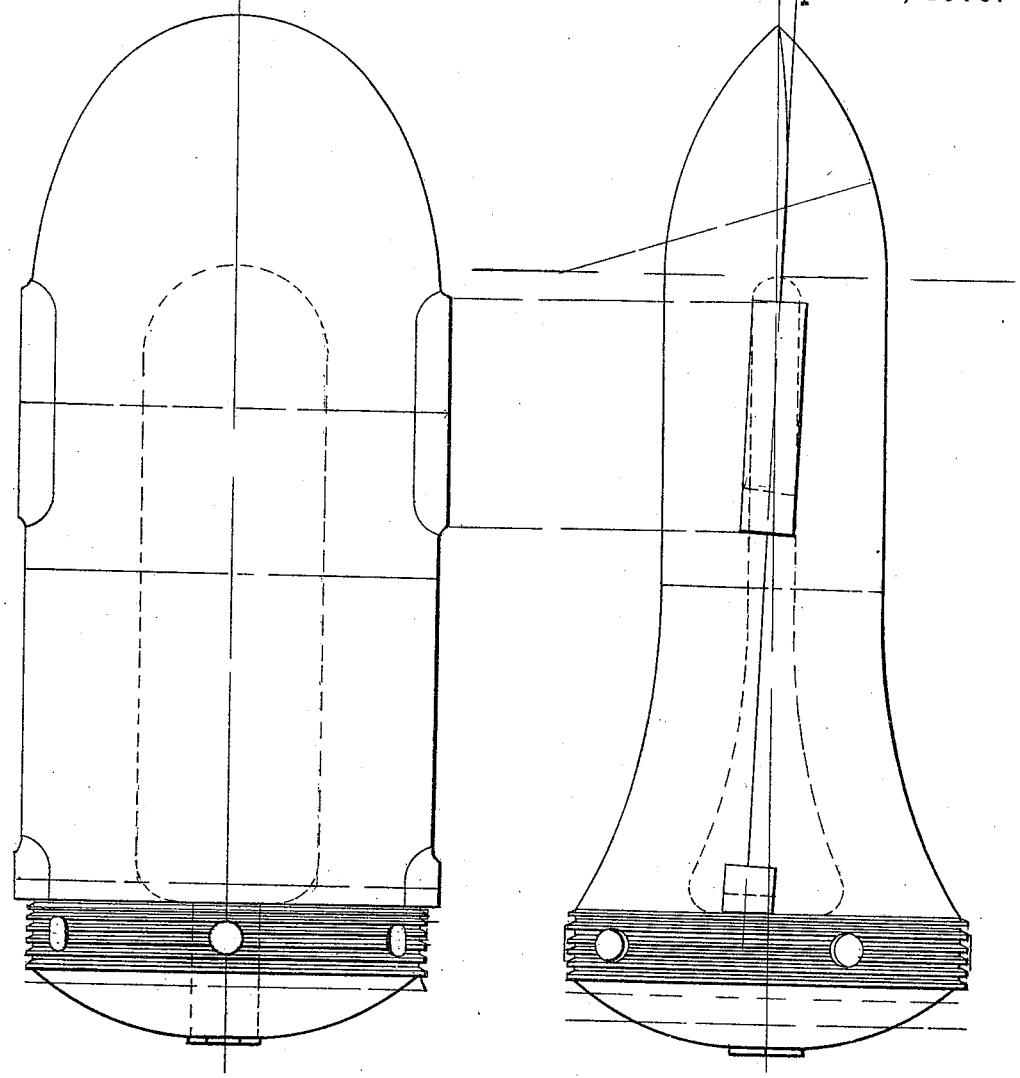

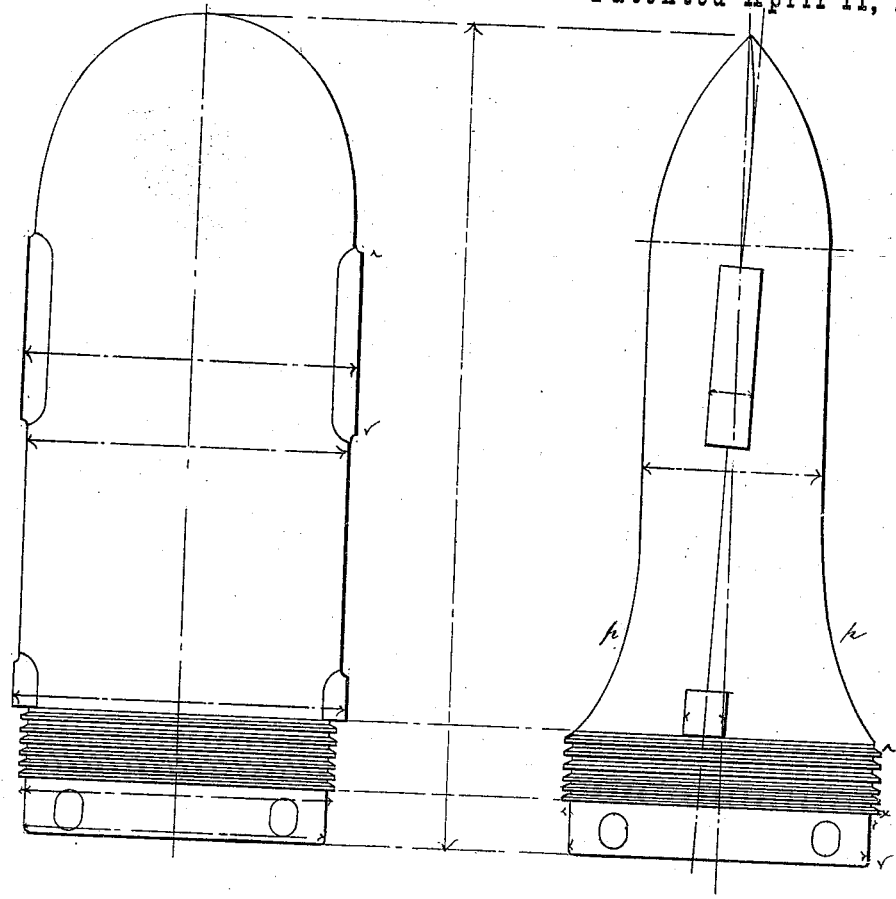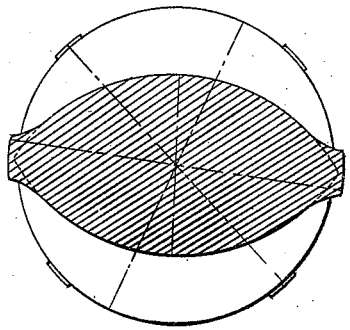

N. WIARD.
PROJECTILES FOR HEAVY ORDNANCE.
No. 176,107. Patented April 11, 1876.
9 Sheets—Sheet 8.
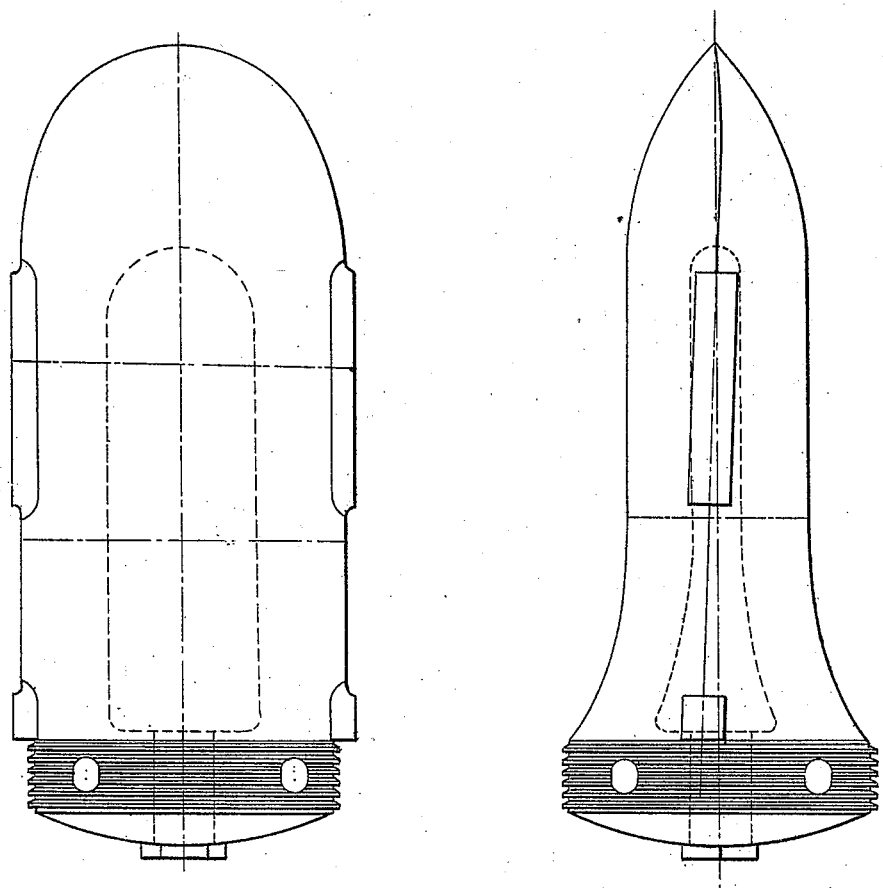
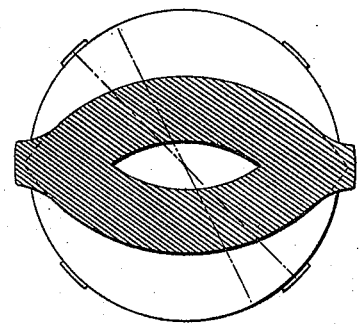

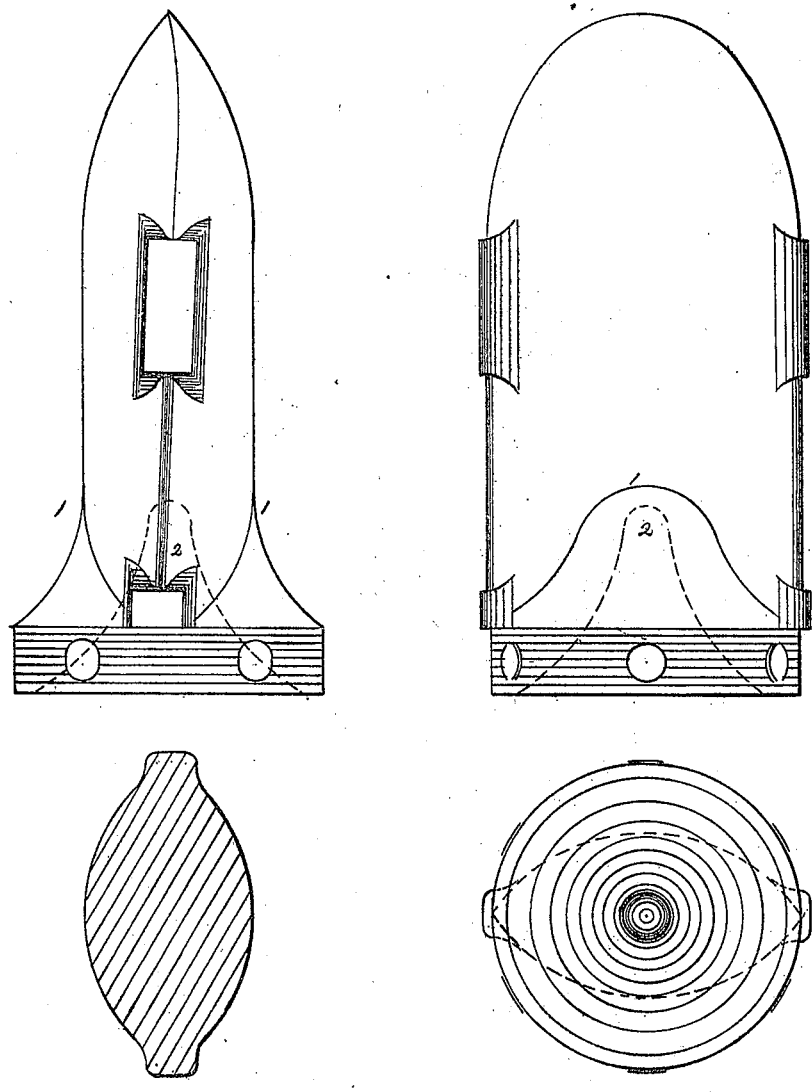

UNITED STATES PATENT OFFICE.

NORMAN WIARD, OF WASHINGTON, DISTRICT OF COLUMBIA.

IMPROVEMENT IN PROJECTILES FOR HEAVY ORDNANCE.

Specification forming part of Letters Patent No. 176,107, dated April 11, 1876; application filed March 2, 1876.

*To all whom it may concern:*

Be it known that I, NORMAN WIARD, of the city of Washington and District of Columbia, have invented a new and useful Improvement in Great-Gun Projectiles, of which the following is a full, clear, and exact description, reference being had to the accompanying drawings, making part of this specification, in which—

Sheet 1 shows a fifteen-inch solid shot in two side elevations and cross-section. Sheet 2 shows a fifteen-inch cored shot with the same views. Sheet 3 shows an eleven-inch solid shot with the same views. Sheet 4 shows an eleven-inch cored shot with the same views. Sheet 5 shows a nine-inch solid shot with the same views. Sheet 6 shows a nine-inch cored shot with the same views. Sheet 7 shows a seven-inch solid shot with the same views. Sheet 8 shows a seven-inch cored shot with the same views. Sheet 9 shows a shot cast on such lines that it broke in the gun.

My invention relates to solid shot and shell used in connection with rifled cannon; and it consists in the details of construction hereinafter described and claimed.

In the present condition of national armaments a very large proportion of the great guns on hand are of cast-iron, smooth-bored, and adapted only to spherical shot. Such guns being almost obsolete, owing to recent improvements in armor-plating protection, it becomes a great necessity to improve means of offense by new rifled guns, and an economical desideratum to utilize the smooth-bored cast-iron guns already on hand or mounted, and by some alteration to bring them, if possible, up to the power to overcome the defenses of modern warfare. Alterations such as to bring these great guns to the capacity required are involved in and fully described in my Patent dated March 10, A. D. 1874, and No. 148,535.

The general theory of artillerists from time immemorial has been that the weight of metal in a shot as compared with the weight of metal in a gun should be about as one to one hundred, or, in other words, about one pound avoirdupois in the shot to one hundred pounds in the gun from which it is intended to be used.

Rifled guns require such a length of shot as compared to the caliber that the bearing-points of the projectile shall be sufficiently far apart longitudinally in the bore to prevent the possibility of the longitudinal axes of bore and projectile altering their coincidence while the projectile is in the bore, so as to run no risk of either abrading the gun or breaking off or abrading the guiding parts or flanges of the projectile or the grooves of the gun.

The old cast-iron guns were cast for spherical shot, and the difficulty now in altering them to rifled guns consists in avoiding a change of the necessary ratio between the weight of the shot and the weight of the gun, and at the same time obtain length of shot necessary for bearing-points. These objects I accomplish by producing a projectile which will combine in its body a portion having the greatest capability for puncturing or penetrating, and a portion calculated to receive and utilize the greatest amount of propulsion given from the impulse of the explosion of a charge of powder possible to a given caliber and weight of gun, while the manner of mounting it in the bore, according to the theory of the patent heretofore named, would be most favorable for preventing any waste of its power from upsetting, indentation, undue friction from any cause, or permanent change of form to the gun or projectile, to detract from the ability of the projectile to perform its work, resulting from friction or other retarding expenditures of force while passing out of the gun, and at the same time so to lengthen the shot without increasing its weight as to greatly extend the distance between its bearing-points in the grooves of the gun.

My invention consists in making a projectile with a semi sub-caliber puncturing portion of a form hereinafter described, having a sub-caliber puncturing portion projecting from a base or sabot cast in one piece with it, the sabot being of full caliber, and provided with windage appliances and supporting-points, as hereafter more fully described and set forth.

In order that those skilled in the art may make and use my invention, I will proceed to describe the exact manner in which I have carried it out.

In the said drawings, B is a cylindrical base or sabot of the caliber of the gun to be used, less the necessary windage, provided with grooves $b$ $b$ as windage appliances, and projecting soft-metal (preferably copper) boutons, $c$ $c$, to nearly center the shot, according to the previous patent referred to, and, if a solid projectile, a conical recess, E, of a form hereafter described and shown in Sheet 1.

The puncturing portion A is, in solid projectiles of the heaviest caliber, contracted, as seen in Sheet 1, (a fifteen-inch shot,) abruptly on two sides from the sabot toward the point, and in cross-section in two gradually-receding curved lines, $a$ $a$, so to make its shape lenticular in cross-section, its longest line being about equal to the diameter of the bore until the point of shot is neared, when all the lines are gradually contracted in true curves, forming a blade or point resembling a Roman sword, the top of a bishop's miter, or a mitten, thus forming a shot which I call a mitten-shot, as shown at $d$ $d$. In its longest axis the portion A is cast with a twist, with such proportion to the rifling of the gun that the extremes of the lines $f$ $f$ of the lenticular cross-sectional form are parallel to the lines of the center of the grooves of the gun.

Flanges to give the shot a rotary motion are cast at D D of a size to fit the grooves of the gun, and are located on the forward edges or lines $f$ $f$, so as to properly hold the shot, and support it and guiding it along in the grooves. The bearing-surfaces of these flanges are all in planes parallel to the lines $f$ $f$, and conform to the curvature and cross-section of the grooves in the gun. Two small flanges, D' D', are cast near the sabot, to enter, but not to touch, the grooves, so as to check the windage through the grooves. The shot only has its support upon the flanges D D and the boutons $c$ $c$.

The proportion of the area of a cross-section of the puncturing portion A to superficial area of the base of the sabot B is as one to two, or thereabout; or, in other words, an area of a cross-section of A is equal to one-half or about one-half of the cross-sectional area of B. This proportion, outside the shape of the shot, enables me to utilize the impulse of the explosion of the powder on a given area in driving into an object a penetrating shot of a lesser area, and having correspondingly less resistance, so that I store up in the puncturing portion of the shot about twice the penetrating capacity ever heretofore attained by a puncturing-shot of equal cross-sectional area, except in sub-caliber projectiles.

The projectile being cast with the abrupt contraction, as shown at $a'$ $a'$ on the line $x$ $x$, and with a concavity, E, in its base, the proportion of the thickness of the metal from $a''$ to $a''$ is so arranged that about the instant of the impact of the point of the shot against any resisting object the momentum of the heavy sabot B will expend itself in endeavoring to pass beyond the portion A entering the object and checked thereby, and the shock will break the sabot (if the resisting object sufficiently—as may be—impedes the shot's progress) from the portion A, leaving A in such a condition as to have the least possible resistance due to irregular form.

In order to accomplish the result of having the sabot break from the penetrating portion about the time of impact, yet have it receive the initial force of the explosion without fracturing in the gun or injuring it, great care should be exercised in the thickness of metal $a''$ $a''$, which in a solid shot should be about one-half of the short diameter of the puncturing portion. This is necessary to avoid any inherent unequal tension in the shot, due to unequal cooling at the time of casting or forging, and thereby weakening it, and also to put such a thickness of metal on this line as will make it sufficiently strong to safely receive upon its base the impulse of the discharge.

This necessity I have proven by actual experiments with fifteen-inch projectiles, and smaller calibers fired from altered guns with two grooves, and I find from experience that the best proportion for the thickness of the metal on the line $a''$ to $a''$ in fifteen-inch solid projectiles to be about three and one-half inches, or the proportion heretofore stated, and in about the same proportion in projectiles of other calibers. The length of the puncturing portion should be, for altered smooth-bores, from its tip to the sabot, about equal to one and a half times the diameter of the sabot; and in guns cast for rifling the puncturing portion named above should be from one and a half times to twice the diameter of the sabot. But it is necessary in all projectiles for altered guns to have the distance from the center of the boutons to the forward end of the flanges at least equal to the diameter of the bore of the gun. In experimenting I have discovered that solid shots, made as seen on Sheet 9, having gradually-declining curves 1 1, combined with a deep recess, 2, in their butts, failed and broke in the gun from the impulse of the discharge, owing to a weakness resulting from an equal tension caused by unequal cooling between the inner and the outer curved lines. To overcome this difficulty, I caused these lines to recede more rapidly from each other, and by this means attained a proportion that cooled with sufficient uniformity to avoid the undue tension.

Placing the projectile in the muzzle of the gun, with the flanges D D' in the grooves, the projectile follows the grooves of the rifle while being forced home. The distribution of the weight and the formation of this projectile are such as to reduce to a minimum the force necessary to overcome the *vis inertia* of the shot in starting its rotation around its longest axis, for the reason that the principal weight of metal is located near the center of the bore, and is put in motion through a smaller circumference than the lesser weight near the periphery. After the discharge of the gun, the projectile rotates at a high velocity, and, owing to its twisted formation, penetrates in the manner of a spiral drill or corkscrew.

Of late years the Ogaval point for projectiles has been generally considered as having the greatest penetrating capacity, but experiments prove that my improved projectile will, with the same gun and half the amount of powder, at short range, (one hundred and eighty feet,) perform more work in a more satisfactory manner in passing through fifteen inches of rolled iron than will the Ogaval pointed shot.

The shape of my projectile in its cutting and puncturing point performs an important mechanical function in the accomplishment of these important results. Taking a side elevation of the narrower side of the sub-caliber portion, the outlines conform to an Ogaval point upon a radius of about one and one-half diameters, while a side elevation of the broader side of the sub-caliber portion shows a curvature of a greatly-increased diameter, the contracting or converging curves forming the cutting-edge, so that I combine in this improved point the puncturing capacity of the Ogaval point with the cutting capacity due to the lenticular cross-sectional form, while the greater width strengthens and braces the Ogaval shape in the narrower width.

The grooves $b\ b$ around the sabot are perpendicular to the longitudinal axis of the gun on the side next to the cartridge, and beveled on the side to the point of the shot, the pitch being about one to three. These grooves act in retarding the rapid escape of gas by the instantaneous creation of a series of eddies within them, and these eddies in turn prevent a rapid escape of gas directly through the windage space.

By actual experiments I have discovered that certain limited modifications are necessary to adapt the principle of my invention to projectiles of different calibers, and have the principle conform with all its advantages to the necessities of different kinds of guns; and I will proceed to describe in detail about the lines and proportions of certain projectiles, both solid and cored, for various calibers and designs of guns, as shown in the several sheets of drawings. Sheet 1 shows a solid fifteen-inch shot, as hereinbefore described. Sheet 2 shows a cored shot of the same caliber, the outer lines being on more gradual curves, as seen at $i\ i$, to enable the chamber H to be enlarged; and the lower base is slightly convex, as at I, so as to strengthen the shot, it being hollow, from the concussion of the discharge. The thickness of metal in the body of this shot is about the same as on the line from $a''$ to $a''$, (Sheet 1,) and continues so throughout its extent. Sheet 3 shows an eleven-inch solid shot, and as the caliber decreases slightly the curved lines $a'''\ a'''$ are slightly more graduated toward the point, and it has a concave base. Sheet 4 shows an eleven-inch cored shot having about the same outline as the solid of the same caliber and a slightly convex base. Sheet 5 shows a nine-inch solid shot, built substantially on the proportions named. Sheet 6 shows a nine-inch cored shot, following out the principle herein stated. Sheet 7 shows a seven-inch solid projectile, with curved lines $p\ p$ slightly more graduated toward the point. Sheet 8 shows a seven-inch cored shot on the same principle, and Sheet 9 shows a shot on such curves that it broke in the gun, as hereinbefore set forth and described.

The cored shots may have the bursting-charge, which is introduced through the screw-hole $l$, stopped by a plug, $k$, in the slightly-convex butt, exploded by either a time or percussion fuse, or the charge, or by the heat of concussion. When advisable, I propose to introduce into the opening $o$ a paper-cased meal-powder time-fuse or a Boarman fuse.

Projectiles under my improved plan, as herein developed and explained, when made for guns cast for rifling allow a great increase of distance between the points of support in the grooves. The shot is of a graceful appearance, has a perfect tone in flight, a high initial velocity, an extraordinary terminal velocity, a very low trajectory, and great precision.

During a long, laborious, and expensive series of experiments, I have shown that from my altered smooth-bore fifteen-inch cast-iron gun, I am enabled with seventy pounds of oriental mammoth powder, at short range, one hundred and eighty feet, to put a shot, such as shown in Fig. 1, weighing five hundred and thirty-two pounds, through fifteen inches of rolled-iron plates securely fastened together, and thence penetrating thirteen feet nine inches of hard gravel backing. I have also at long range, about one mile distant, with a charge of seventy pounds of the same powder, put a like shot (five hundred and thirty-two pounds) through a target composed of rolled-iron plates twelve inches in thickness, and weighing ninety-six thousand pounds, and thence penetrating a very hard clay and gravel bank to the distance of three feet. These results are such as have never been before attained in gunnery, and, owing to the expense and magnitude of the experiments to determine them practically, they become most valuable additions to the art, as being demonstrated certainties, instead of undeveloped and fine-spun theories.

I have been accustomed to chill my projectiles down to a slightly descending curved line from the forward ends of the flanges, but I have discovered that it is a better mode of chilling to throw a chill in the form of decreasing steps down between flanges, as seen in Fig. 1, for the reason that this chill aids in cooling the thick part of the mitten-shaped portion, in order to have it cool as quickly or nearly as quickly as the thinner parts toward the edges, and thus prevent as much as possible any unequal tension.

Having thus described my invention, what I claim as new, and desire to secure by Letters Patent, is—

1. A mechanical-fit projectile, having a sub-caliber puncturing portion of chilled cast-iron, provided with a full-caliber sabot and flanges, all made together in one piece, substantially as and for the purpose set forth.

2. A projectile, having a sub-caliber puncturing portion of lenticular cross-sectional form, provided with a full-caliber sabot, substantially as and for the purpose described.

3. In combination with a base or sabot, B, the mitten-shaped puncturing portion A, having its body twisted forward of the sabot to conform to the pitch of the rifling of the gun, substantially as and for the purpose herein set forth.

4. The mitten-shaped portion A, provided with the flanges D, substantially as described.

5. The hollow mitten-shaped sub-caliber portion A', with or without the fuse-hole $o$, and provided with a full-caliber sabot, B, with the opening $l$ and plug $k$, substantially as set forth.

6. In mechanical-fit projectiles, the grooves $b\ b$ for retarding the flow of gas around the windage space, as set forth.

7. As an improvement in great-gun projectiles, a projectile having the points with the converging lines $r\ d\ s$ and $t\ d\ p$, so as to form the gradually-contracting cutting-point $r\ d\ s$, substantially as and for the purpose set forth.

8. A centered projectile with windage, having its body twisted to conform to the pitch of the rifling of a gun, and having a point of an Ogaval form, of about one and one half diameters radius on its narrower side elevation, and the curvature of the point on the wider side elevation of a greatly-increased diameter, and its general form lenticular or oval in cross-section, substantially as and for the purpose described.

NORMAN WIARD.

Witnesses:
 JOHN A. DARLING,
 DAVID G. WEEMS.